United States Patent [19]

Ogasawara et al.

[11] 3,924,045
[45] Dec. 2, 1975

[54] MULTI-LAYER CONJUGATE FIBER AND PROCESS AND APPARATUS FOR THE PREPARATION THEREOF

[75] Inventors: Masafumi Ogasawara; Masanori Akita, both of Otsu; Kazuhiko Saito, Kusatsu; Yoshikazu Kikuchi; Mitsuhiro Shiokawa, both of Otsu, all of Japan

[73] Assignee: Toray Industries, Inc., Tokyo, Japan

[22] Filed: Feb. 19, 1974

[21] Appl. No.: 443,506

[30] Foreign Application Priority Data
Feb. 26, 1973  Japan.............................. 48-22246
Mar. 31, 1973  Japan.............................. 48-37155
Apr. 6, 1973  Japan.............................. 48-38765

[52] U.S. Cl. ............... 428/373; 264/171; 425/131; 428/392; 428/393; 428/394; 428/370; 428/395; 428/397; 428/401; 428/913; 8/21
[51] Int. Cl.² ......................... B29F 3/10; D02G 3/00
[58] Field of Search .......... 161/175, 176, 177; 8/21; 264/171; 425/131; 428/397, 373, 374, 392, 393, 394, 395, 370, 401, 913

[56] References Cited
FOREIGN PATENTS OR APPLICATIONS
44,447  11/1972  Japan................................. 264/171
5,178  2/1968  Japan................................. 264/171

*Primary Examiner*—Lorraine T. Kendell

[57] ABSTRACT

Different fluid polymers are continuously discharged into a limited space, at the same time, with passages for the polymers being moved relative to spinning orifices of a spinneret. A multiple layer flow is formed in which the different polymers alternate in the direction of flow. When the multiple layer flow is passed through the orifices of the spinneret plate, cooled and solidified or dried and coagulated, a fiber is obtained in which the different polymers are alternately arranged along the fiber. The interfaces between the different polymers are parabolic curved surfaces.

15 Claims, 23 Drawing Figures

PRIOR ART

MULTI-LAYER CONJUGATE FIBER AND PROCESS AND APPARATUS FOR THE PREPARATION THEREOF

BRIEF SUMMARY OF THE INVENTION

The present invention relates to a novel fiber in which synthetic high molecular weight polymers having different properties are alternately arranged in the direction of the fiber axis and each of the respective polymer sections form a fiber-like material which is continuously joined to the adjacent polymer with a parabolic interface. This invention also relates to a process and apparatus for making such fibers.

Heretofore, attempts have been made to improve various fiber characteristics. For example, various fibers are known which are composed of synthetic high molecular weight polymers having different properties, which are so arranged that they have either a side-by-side cross section, a sheath-and-core cross section, a granular islands-in-a-sea type cross section (fibers composed of many blended components), continuous islands-in-a-sea type cross section (each fiber composed of many fibrils), and a sandwich type cross section. Also, fibers are known in which different polymers are alternately arranged in the direction of the fiber axis (fiber with longitudinal layers).

Even if the polymers used are the same, these various known fibers exhibit different properties in many cases due to differences of the aforesaid shapes, and the shape and structure of the fiber are often determined according to the intended use.

Specifically, a fiber having a sheath-and-core structure is suitable for use as an optical fiber. One having a side-by-side structure is suitable for making a bulky yarn. When there are voids inside a fiber, it should be made into a fiber composed of many blended components. When a fiber of very fine denier is used for making synthetic leather, it should be composed of many fibrils. Further, in order to make a fiber that can be "space-dyed," longitudinal layers should be provided in the direction of the fiber axis. Fibers having such new structures and shapes are given new characteristics by reason of those structures and shapes.

One object of the present invention is to provide a fiber having a novel structure which has heretofore been unknown and to provide, by such structure, characteristics which have not been achieved by conventional fibers such as, for instance, unique effects in dye acceptance, luster and touch.

Another object of the present invention is to develop various further special characteristics by subjecting the fiber to selected chemical and/or physical treatments.

Other objects and advantages of this invention will become apparent from the accompanying drawings and from the following detailed description, which is intended to be exemplary and not to limit the scope of the appended claims.

DRAWINGS

FIG. 2 (a) is a schematic view of one embodiment of an apparatus according to the present invention. FIG. 2 (b) shows a typical distribution of polymer passages on the rotary cylinder plug used in an apparatus of the type represented in FIG. 2 (a). FIG. 2 (c) shows a typical distribution of spinning orifices on the spinneret plate which may be used in apparatus such as that of FIG. 2 (a).

FIG. 4 (a) is a ground plan view of a spinneret with watersheds provided in a multi laminar chamber, and FIG. 4 (b) is a view in partial section of the spinneret.

FIGS. 7 – 15 are views in cross section of various multiple layer conjugate fibers according to the present invention; in FIG. 7 the annular rings have regularity and FIGS. 8 – 15 show embodiments wherein the annular rings are irregular.

FIGS. 18 (a), (b) and (c) are views of various multiple layer conjugate fibers of this invention, having phases arranged alternately in the direction of the fiber axis.

DETAILED DESCRIPTION OF THE INVENTION

Figure 1:
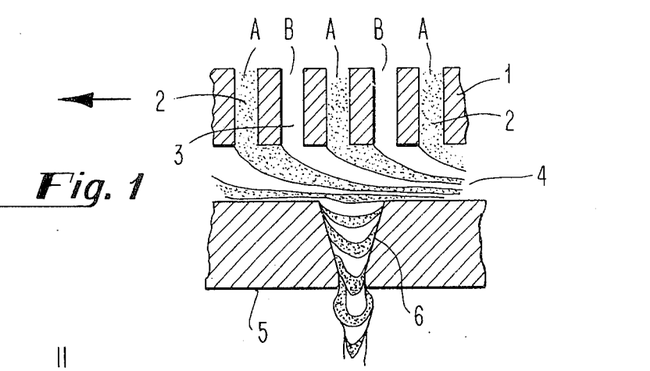
FIG. 1 is a partial sectional view of a spinning pack illustrating the preparation of a special fiber according to the present invention.

Referring to FIG. 1, a plurality of polymer passages 2, 3 are provided in parallel in a flat plate 1. Into the polymer passage 2 a polymer A is positively supplied; into the polymer passage 3 a polymer B is positively supplied. A spinneret plate 5 is located downstream of the flat plate 1, spaced apart by a limited space 4 between plate 1 and plate 5. On the spinneret plate 5, spinning orifices 6 are provided. They extend in the same direction as the polymer passages 2, 3. Accordingly, when the polymers A, B are positively forced through their orifices and the flat plate 1 is moved in the direction of the arrow in FIG. 1, both streams of polymers A, B change their flow directions in the space 4; a multilayer flow results as shown in FIG. 1, wherein the polymers A, B are alternately laminated in a belt-like manner. The multiple layer flow formed in space 4 is discharged from the spinning orifices in a laminated condition. When the multiple layer flow passes through a spinning orifice 6, a velocity difference develops as between outer portions of the polymer contacting the internal surface (circumference) of the spinning orifice 6 and the inner portion of the polymer passing through the center of the same spinning orifice. Therefore, the multiple layer flow which was parallel in space 4 is squeezed and discharged in a configuration of the type shown in FIG. 1, wherein the adjoining surfaces are parabolic curved surfaces wherein a plurality of polymer passages are provided. If an infinite number of these polymer passages were provided, the polymers A, B would be discharged continuously from the spinning orifices. However, in actual practice it is not possible to move a flat plate provided with an infinite number of polymer passages on a line.

Figure 2A:
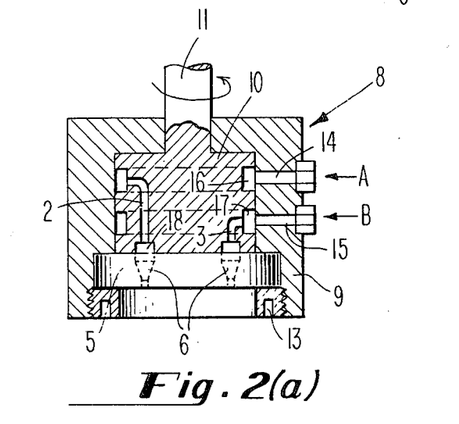
Figure 2B:
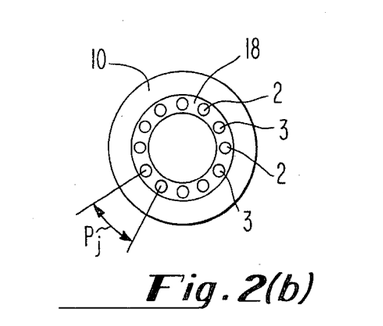
Figure 2C:
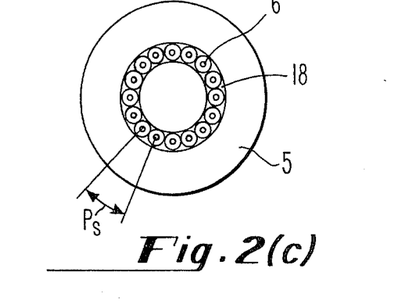

One form of apparatus embodying the principle shown in FIG. 1, is shown in FIG. 2. A spinning pack 8, in a pack case 9 has a rotary cylinder plug 10 and a spinneret plate 5. The rotary plug 10 is of such a structure as to be capable of power rotation in the direction of the arrow appearing in FIG. 2 (a) by means of a drive shaft 11 fixed to the rotary cylinder plug 10. On the other hand, the spinneret plate 5 is fixed to the housing 9 by a spinneret holder 13. Two different polymers A, B are introduced into the housing 9 from inlets 14, 15 and into two spaced-apart polymer feed grooves 16, 17 provided on the outer periphery of the rotary plug 10. These grooves 16, 17 communicate with the polymer passages 2, 3, respectively, which are formed in the rotatable plug 10. The polymer passages 2, 3 are alternately arranged at the same radius, and open out at the lower surface of the rotary plug 10. Some of the details of the end of plug 10 are shown in FIG. 2 (b). The spinning orifices 6 provided on the spinneret plate 5 are bored in the same direction as the holes 2, 3 of the plug 10, in positions that line up with these polymer passages 2, 3. Means are provided for forming a limited space, or multiple laminar chamber 18. The arrangement or distribution of the spinning orifices 6 on the adjacent surface of the spinneret plate 5 appears in FIG. 2 (c). Each multiple laminar chamber 18 is formed partly in the rotary plug 10 and partly in the spinneret plate 5.

When the polymers A, B are positively supplied to the apparatus shown in FIG. 2 (a) and the drive shaft 11 is driven by a motor (not shown), the rotary plug 10 is rotated. Because the spinneret plate 5 is fixed, as shown in FIG. 1, an indefinite number of polymer passages is caused to pass by the spinning orifices 6 and the relative movement of plug 10 and spinneret plate 5 may be continued indefinitely. The individual thicknesses of the multiple layers flowing in the chamber 18 may be varied, depending upon the rate of movement of the polymer passages 2, 3 relative to the spinneret plate passages 6, and the amounts of polymers A, B flowing from the polymer passages 2, 3 per unit of time. The shape of the interface, which constitutes a parabolic curve, may be varied depending upon the diameters of the spinneret orifices 6, the effective length of the orifices 6 and the viscosities of the polymers A, B. Therefore, when these conditions are determined, it is possible to obtain fibers having various characteristics.

In FIG. 2 (a), an apparatus is shown in which a rotary plug 10 is rotated. However, the same effect may be achieved by rotating the spinneret plate 5 instead, leaving the plug 10 stationary or moving at a different speed or in a different direction.

Again, in FIG. 2 (a) the polymer passages 2, 3 are arranged in a concentric circle on the lower surface of the rotary plug 10. However, the polymer passages may instead be radially arranged and extend toward the outer peripheral surface of the rotary plug 10.

Figure 3:
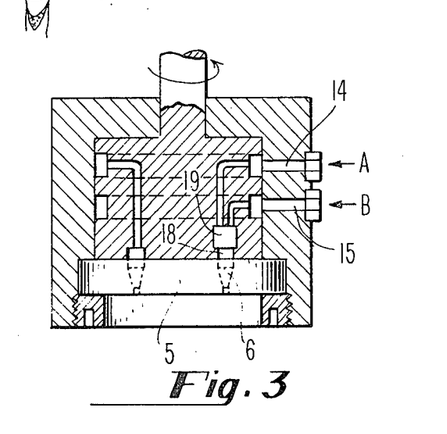
FIG. 3 shows another embodiment of apparatus according to the present invention, arranged for spplying a composite flow into the polymer passages.

As shown in FIG. 3 a laminating or combining chamber 19 has been provided in one of the polymer passages (3, for example); both polymers A, B may be introduced into chamber 19, causing the polymers A, B to flow as a composite. It is possible to use various cross sections for the composite flow obtained in chamber 19; any known shapes may be used such as side-by-side (bimetal), sheath and core, islands-in-a-sea and sandwich formations. Also, it is possible optionally to change the composite ratio. Further, it is possible to provide a laminating or combining chamber in each polymer passage and to provide an optional number of polymer passages. Further, it is also possible optionally to establish the shape of the composite flow in each individual polymer passage. As such, it is possible to use not only polymers A, B, but also to use another polymer C, having properties that may be similar to or different from A and B, or either. When such procedures are adopted, it is possible to prepare fibers of widely varying types.

In the forms of apparatus shown in FIGS. 2 (a) and 3, the multiple laminar chamber 18 is formed jointly by the rotary plug 10 and the spinneret plate 5. However, it is possible to provide this chamber 18 on the spinneret plate 5 only, or on the rotary plug 10 only, if desired.

When the multiple laminar chamber 18 is provided in the spinneret plate 5, arranged to introduce the multiple layer flow to the spinning orifices 6, this sometimes creates a disturbance of the streamline of the multiple layer flow or stagnation of the polymers, causing contamination, unless a special flow guide is provided. Accordingly, an inverse conical guide hole is provided as shown in FIGS. 1 and 4 (b), on account of which the thickness of the spinneret plate (length of spinning orifices) increases. Therefore, the parabolic curved surface of the interface between the polymers becomes quite long.

On the other hand, when the multiple laminar chamber 18 is provided on the side of the rotary cylinder plug 10, it is possible to introduce the multiple layer flow to the spinning orifices in a regular manner. Therefore, it is unnecessary to provide an inverse conical guide on the side of the multiple laminar chamber of the spinning orifices, and the thickness of the spinneret plate may be reduced. It is considered preferable that the width of the multiple laminar chamber 18 be about the same as the diameter of the inlet portion of the spinning orifices. Because of that, the parabolic interface between the polymers is not subjected to a high wall friction in the spinning orifices and the length of the parabolic interface may be reduced.

The forms of the apparatus shown in FIGS. 2 (a) and 3 illustrate designs that fall intermediate the two extremes. These conditions may be freely varied in accordance with the nature of the fiber to be prepared.

Figure 4A:
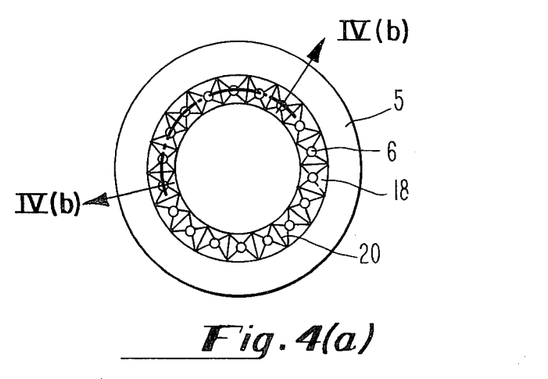
Figure 4B:
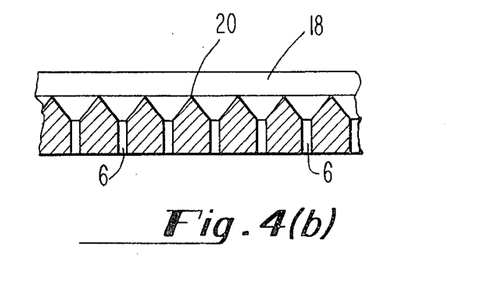

FIGS. 4 (a) and (b) show an apparatus wherein the bottom surface of the multiple laminar chamber, which is located in the spinneret, is lowered toward the spinning orifices and raised midway between spinning orifices, to form watersheds 20. This affirmatively maintains streamline flow and prevents thermally degraded or abnormal polymers from forming and being introduced into the product.

In the forms of the apparatus shown in FIGS. 2 (a) and 3, introduction of the polymers having different properties is carried out by the polymer feed grooves 16, 17. However, it is possible instead to provide polymer feed grooves on the internal surface of the housing 9, on the upper surface of the rotary plug 10 or on the rotary shaft 11.

Also, in the forms of the apparatus shown in FIGS. 2 (a) and 3, it is possible to make the cross sections of the spinning orifices circular as well as Y-shape, T-shape, or other selected cross sectional shapes.

It is now desired to discuss the relationship between the pitches of the polymer passages 2, 3 provided on the rotary plug 10 and the pitches of the spinning orifices of the spinneret plate 5. These pitches are defined as the angle between radii extending through the centers of adjacent orifices. It is apparent from the foregoing description that the circle on which the polymer passages 2, 3 are arranged and the circle on which the spinning orifices 6 are arranged are described about the same center and have the same radius.

Now, if it is assumed that the pitches $P_j$ of the polymer passages are the same, $m$ kinds of different polymers are arranged alternately in order and the pitches $P_s$ of the spinning orifices are the same pitch (see FIGS. 2 (b) and (c)).

When they are in the following relationship:
$$P_s = m \cdot n \cdot P_j \quad (1)$$

Figure 18A:
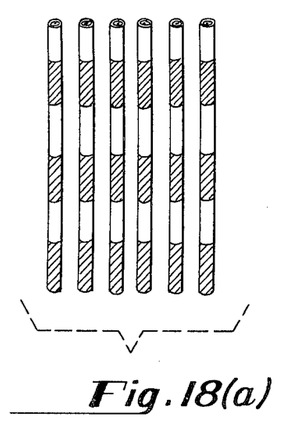

(wherein $n$ is an integer from 1 to $n$) the arrangement of the polymers discharged from a plurality of spinning orifices always becomes one in which the phases of the polymers are synchronized in unison with each other in the direction of the fiber axis, as shown in FIG. 18 (a).

Figure 18B:
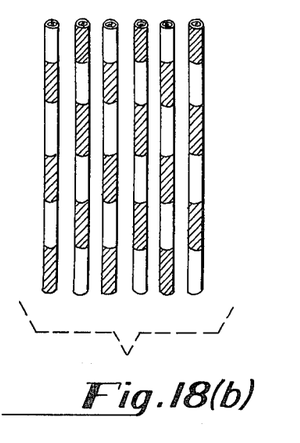

When they are in the following relationship:
$$P_s = \{m \cdot n - (m-1)\} P_j \quad (2)$$

an alternate arrangement of polymers is obtained; a constant number of polymer phases slides in the direction of the fiber axis, as shown in FIG. 18 (b).

Figure 18C:
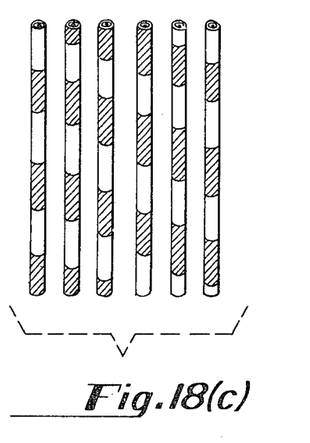

When they are in the following relationship:
$$\{m \cdot n - (m-1)\} P_j < P_s < m \cdot n \, P_j \quad (3)$$

an alternate arrangement of polymers is discharged from the spinning orifices; individual polymers slide individually in the direction of the fiber axis, as shown in FIG. 18 (c).

When they are in the following relationship:
$$P_s < P_j \quad (4)$$

an alternate arrangement of polymers is discharged from the spinning orifices; polymer slides completely in the direction of the fiber axis.

In the aforesaid relationships (1) – (4), both the spinning orifices and the polymer passages have the same pitch. However, by varying the pitch of both or either, it is possible to change the alternating arrangement of the polymers discharged from the spinning orifices.

Upon spinning multifilaments, by selecting the arrangement of the polymer passages and the spinning orifices, it is possible to select optionally the phases of the different polymers and their arrangement in the direction of the length between each of the monofilaments.

Next, a detailed explanation will be made with reference to a multiple layer conjugate fiber which can be made according to the present invention.

Figure 5:
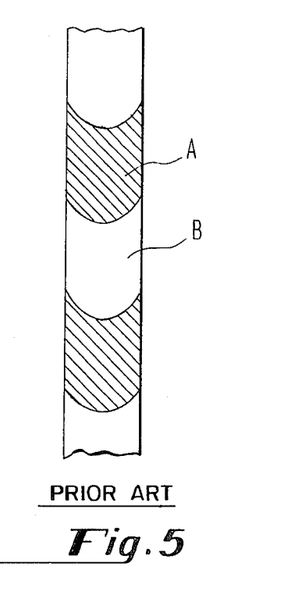
FIG. 5 is a view in longitudinal section, showing a conventional fiber with longitudinally successive layers.

FIG. 5 is a longitudinal side section of a known fiber having individual longitudinal layers. Such fibers may be made by methods disclosed in Japanese Patent Application Publications No. 5178/1968 and No. 44447/1972 which explain that effects with different colors, and bulky yarns as well, may be obtained. However, using such conventional methods, multiple layer conjugate fibers having an annular ring-like section, such as the fibers according to the present invention have not been attainable. In conventional methods, there have been fluid flow problems in alternately flowing at least two different synthetic polymers. It has been technically difficult to reduce the distance through which the polymers are caused to flow and to form the polymers into thin layers. We, however, have developed a novel spinning apparatus making use of a circular motion, and have succeeded in drastically shortening the fluid path. At the same time, we have succeeded in laminating at least two different synthetic polymers in the form of thin layers. Further, we have found proper conditions with reference to the shape of the slit and the shape of the hole and have succeeded in obtaining a multiple layer conjugate fiber having an annular ring-like section.

The synthetic polymers as referred to in the present invention include, first of all, different kinds of polymers which have different physical and/or chemical properties. They include, further, the same synthetic polymers which differ in physical and/or chemical properties formed, for example, by adding a third component to one of them.

The physical or chemical properties as referred to in connection with the present invention include, for example, melting point, refractive index, luster, dyeability, contractibility, tenacity and elongation, antistatic properties and wettability.

Figure 6:
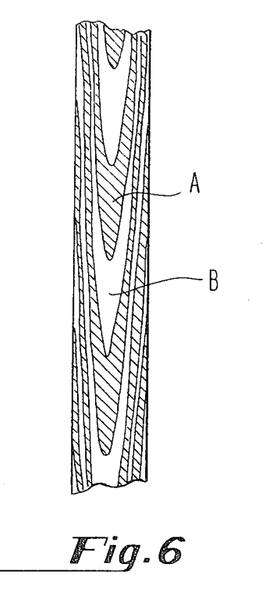
FIG. 6 is a comparable view in longitudinal section, showing a multiple layer conjugate fiber according to the present invention.
Figure 7:
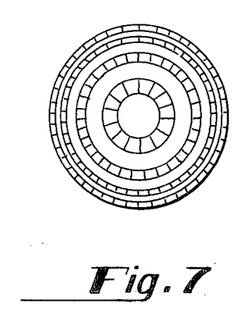

FIGS. 6 and 7 show a conjugate fiber whose annular rings have regularity. The characteristics in terms of shape of the multiple layer conjugate fiber of the present invention, in the direction of the fiber axis, are different from a conventional core-and-sheath structure in that different kinds of polymers are laminated and have parabolic boundary surfaces and that, in cross section, the layers are substantially ring-like structures.

The multiple layer conjugate fiber of the present invention has different properties as compared to hitherto known fibers, either those provided with longitudinal layers or those with sheath and core structures. For example, by laminating layers of polymers having different refractive indices, which layers are so thin that their thickness is of the order of the wave length of light, and laminating such thin layers, an optical effect is obtained due to diffraction and interference of light. And even when the layers are thick, when polymers of different dyeability are used, a color interference effect is produced in a dyed product. When the annular ring-like fiber is prepared by combining a polymer having a high tensile strength with a brittle polymer or an incompatible polymer on the other hand, and when a bundle of fibers is stretch-broken on a "Turbo" stapler and a "Perlock" converter, fibers are produced which have parabolic tips. Knitted goods or woven fabrics using these staple fibers have outstandingly good touch or feel.

By heating a bundle of long fibers and a bundle of staple fibers or a fiber prepared by using a high melting point polymer on one hand and a low melting point polymer on the other hand, to a temperature higher than the melting point of said low melting point fiber, a network of adhered fibers is obtained.

When polymers having different contractibility are used and the centers of the annular rings are slid eccentrically, a bulky yarn is obtained.

When polymers having different solubility are used and a surface portion of one polymer is dissolved, fibers having different surface luster and touch are obtained.

When a hygroscopic (wettable) polymer is used as one polymer, a hygroscopic (wettable) fiber having excellent coloring properties and luster is obtained.

When an antistatic polymer is used as one polymer, an antistatic fiber having excellent coloring properties and luster is obtained.

Thus, a multiple layer conjugate fiber of the present invention may well be said to be greatly different in practical effect from fibers of the prior art, particularly from fibers provided with longitudinal layers as shown in FIG. 5 of the drawings, and also from sheath-and-core fibers having many layers.

FIGS. 8 – 15 are cross sections of multiple layer conjugate fibers of the present invention, showing various forms having annular rings of an irregular nature.

Figure 8:
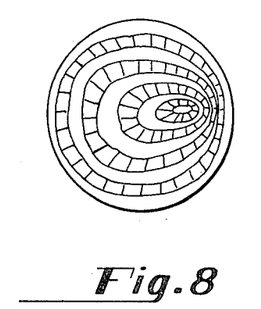

FIG. 8 shows a cross section of a fiber obtained when the outlets (discharge holes) are slid eccentrically upon discharging the laminated polymers. This structure is especially suitable for making a bulky yarn.

Figure 9:
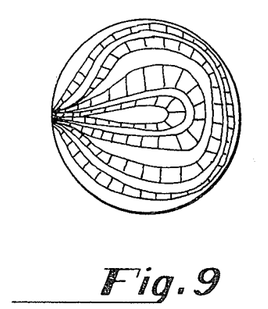
Figure 10:
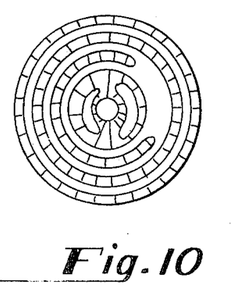

Fibers having such cross sectional configurations as shown in FIGS. 9 and 10 are produced in many cases mainly because of pressure changes upon laminating polymers into thin layers; however, these configurations are substantially annular ring-like structures and these fibers are not significantly different in practical effect from typical annular ring-like fibers.

Figure 11:
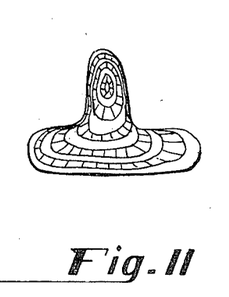

FIG. 11 shows the configuration of a fiber obtained when the cross section of the discharge holes (orifices) is T-shaped or Y-shaped, and this configuration is suitable when silk-like fibers are desired. Further, there is no objection to the use of discharge holes (orifices) having a triangular cross section.

Figure 12:
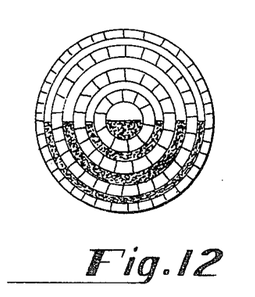

FIG. 12 shows a fiber obtained by using polymers flowing into the outlet 14 shown in FIG. 3 which are made into a side-by-side pattern in cross section and the layers are formed in an annular ring-like pattern in this case too.

Figure 13:
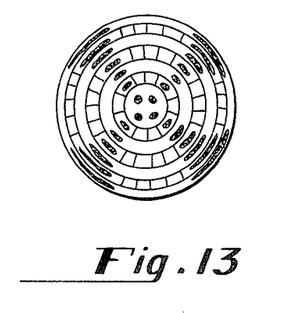

FIG. 13 is a cross sectional configuration of an annular ring-like fiber obtained by using polymers flowing into the outlets 2, 3 shown in FIG. 2 (a) which are formed into an islands-in-a-sea type pattern.

Figure 14:
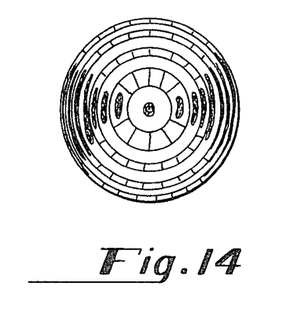

FIG. 14 shows a cross sectional configuration of an annular ring-like fiber obtained by using polymers flowing into the outlets 2, 3 shown in FIG. 2 (a) which have a sheath-and-core type pattern in cross section.

The cross sectional configurations shown in FIGS. 12 – 14 are obtained when a multi-laminar chamber 18 as shown in FIG. 2 is provided and proper intervals are established.

Figure 15:
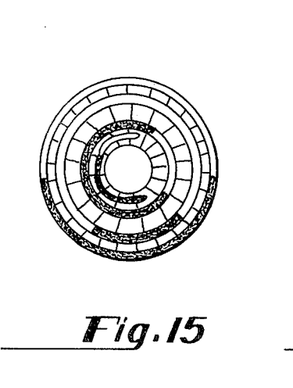

FIG. 15 is a cross sectional configuration of a fiber obtained when a polymer flowing into the outlet 2 or 3 has a side-by-side type pattern in cross section and is spun using an apparatus having a relatively thin layered multi-laminar chamber 18. And even when the same polymer is used, depending upon the degree of thickness of the multi-laminar chamber 18, the cross sectional configuration is of the type shown in either FIG. 12 or FIG. 15. However, the fact remains that an annular ring-like pattern can be formed.

Figure 16:
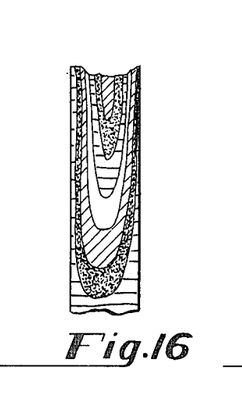
FIG. 16 is a view in longitudinal section of a multiple layer conjugate fiber having four components.

FIG. 16 is a longitudinal side section of another fiber which may be made according to the present invention. Specifically, when the polymers used consist of four components A', B', C' and D' and these polymers are successively laminated, a longitudinal side section as shown in FIG. 16 is obtained. In order to provide excellent coloring properties as well as high luster and fine touch that are the characteristics of fibers of the present invention, it is necessary to form the polymers into sufficiently thin layers and form the laminated polymers into parabolic shapes that are stretched out as much as possible in the direction of the fiber axis (spinning direction) to increase the number of substantially annular rings in the cross section of the fiber. Namely, in a multiple layer conjugate fiber of the present invention, it is desirable that the number of substantially annular rings in the cross section is preferably at least 3, and more preferably at least about 6.

In order to obtain an optical effect in accordance with the present invention, it is preferable that in the cross section of the fiber, the intervals between the annular ring-like layers become substantially smaller in order from the center through the outer layers of the fiber so that the minimum interval at the outer layer falls within the limit of about two microns.

Referring to the longitudinal side section of the fiber (FIG. 16), it is preferable that the distance between the tips of central components having parabolic curved surfaces should be at least about 0.1m. Further, it is preferable that the length of each parabola, namely, the distance in an axial direction from the tip of the parabola to the point on the outside surface of the fiber where the parabola becomes tangent, be at least $10^4$ times the fiber diameter. In this case, it is also possible to make the distances between the central components which adjoin the different synthetic polymers unequal. In order to obtain an optical effect, it is preferable that the difference between the respective refractive indices of polymers be in the range of about 0.01 – 0.25, when measured with a sodium monochrome ray (wave length 589μ) under the same measuring conditions. In order to obtain special properties of touch, it is preferable that the difference in melting point of the different polymers be 10°– 200° C inclusive. When fibers composed of polymers having different melting points are texturized, a linen-like special touch is obtained.

Figure 17:
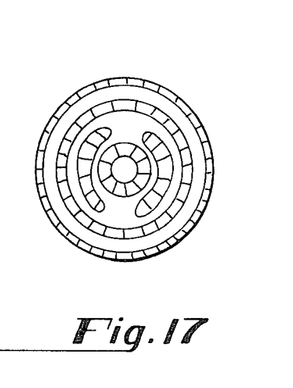
FIG. 17 shows a number of annular rings of a multiple layer conjugate fiber according to the present invention.

FIG. 17 is a schematic view illustrating a way of counting the number of annular rings in a fiber according to the present invention. On the cross section of such fiber, two lines intersected at a right angle at the center of the polymer are drawn and the number of intersections of these lines with boundary surfaces are counted. Of these two numerical values, the larger value divided by two is the number of layers referred to in the present invention. When the annular rings are concentric when viewed on a cross section as shown in FIG. 7, the numbers of the intersecting points of the two lines are equal. However, in the case of annular ring-like layers which are partly distorted as shown in FIG. 17, the numbers of intersections are different. However, that difference is not very large. When the number of intersections of one line is less than one-fourth that of the other line, it cannot be said that the layers are substantially like annular rings.

A multiple layer conjugate fiber of the present invention may be prepared by hitherto known spinning methods such as melt spinning and solution spinning (wet spinning, dry spinning and emulsion spinning) by using an apparatus laminating thin layers of different kinds of polymers, principally by making use of a circular motion as shown in FIGS. 2 and 3. However, in order to obtain a multiple layer conjugate fiber of the present invention in an industrially advantageous manner, the methods of melt spinning and wet spinning are particularly suitable.

And when the fiber is composed of two kinds of synthetic polymers, it is preferable to make the ratio of the two from 20/80 to 80/20 in order to develop the characteristics of the two and to provide advantageous productivity.

It is possible to prepare a multiple layer conjugate fiber of the present invention from various hitherto known polymers and the representative polymers will be discussed hereinafter. However, the present invention is not to be limited to the specific polymers discussed. And there is no objection to the incorporation of various additives into the same polymer. For example, a fiber may be composed chemically of the same synthetic polymers, which are different in respect to additives and added amounts of third components, such as pigments, dyestuffs, delustrants, antistatic agents and flame retardant agents.

A fiber according to the present invention may be obtained from polymers such as polyolefin (polyethylene, polypropylene), polyamide (nylon-4, nylon-6, nylon-66, nylon-12, aromatic polyamides such as poly p-phenylene terephthalamide and poly m-phenylene isophthalamide), polyacrylonitrile, copolymers consisting mainly of acrylonitrile, polyester (polyethylene terephthalate, polybutylene terephthalate, modified polyesters having a metal-containing sulfonate group, isophthalic acid copolymerized polyethylene terephthalate, adipic acid copolymerized polyethylene terephthalate, a copolymer consisting mainly of terephthalic acid diglycol), a chlorine-containing polymer (polyvinyl chloride, polyvinylidene chloride), a fluorine-containing polymer (polytetrafluoroethylene, polyvinylidene fluoride, an ethylene tetrafluoroethylene copolymer), polystyrene, a copolymer consisting mainly of styrene, polymethyl methacrylate, a copolymer consisting mainly of methyl methacrylate, polyethylene oxide, and polyurethane. In present practice and use, the combination of polyester with polyamide is preferable.

A fiber according to the present invention is suited for a broad range of uses such as clothing applications and industrial uses. However, it is especially suitable for clothing and interior fabrics such as curtains, drapes, carpets and bedspreads and sheets, for example.

EXAMPLE 1

50 parts of polyethylene terephthalate (intrinsic viscosity measured in orthochlorophenol at 25°C of 0.60, refractive index $N_D = 1.58$, containing 0.5% of titanium dioxide, melting point 260° C) and 50 parts of nylon-6 (relative viscosity of solution having a 1 percent concentration measured in 98% sulfuric acid at 25° C of 2.60, refractive index $N_D = 1.54$, containing 0.5% of titanium dioxide, melting point 220° C) used as polymers were prepared using the spinning apparatus shown in FIG. 2, under the following spinning and drawing conditions. The hole diameters and number of holes of the outlets of the rotary cylinder plug were 5 mm and 20, respectively, the width and depth of the slit were 5 mm and 2mm, respectively and the number of orifices of the spinneret plate was 18. The spinning temperature was so established as to become 290° C in the vicinity of the rotary ring plate, the output was 16.8 g/min, the r.p.m. of the rotary cylinder plug was 40 r.p.m. and the undrawn yarn discharged from the spinneret orifices was taken up at a rate of 800 m/min. This undrawn yarn was drawn at a draw temperature of 150° C, a draw ratio of 3.5 and a draw velocity of 500 m/min to obtain multifilaments having a denier per filament of 3. The filaments had laminated 6-layer annular rings having parabolic boundary surfaces in longitudinal side section. Observing the cross sections of these multifilaments, the intervals between the annular layers became successively smaller from the central portion, the minimum interval between the layers was within 1 micron, the distance between the tips of the central components having parabolic curved surfaces was about 3.5 m and the length of the parabola of the same component was more than $10^5$ times the fiber diameter.

Knitted goods obtained by knitting these multifilaments were dyed using a yellow acid dyestuff, Suminol Fast Yellow R conc., (C. I. acid yellow 25) (0.5% owf) while the pH of the dye liquid was controlled to 4 with acetic acid, the dye liquid was heated to about 100° C within 30 minutes and boiled for 30 minutes to selectively dye the ring-like layers of nylon-6. The dyed knitted goods showed a light color as compared with a dyed knitted goods solely composed of nylon-6 multifilaments. However, its tint showed a deep luster with various colors showing an interference effect. By conventional methods of dyeing, it was not possible to obtain a knitted goods having such a deep tint, but in the case of such a multiple layer conjugate fiber having annular ring-like layers, the surface of which had a thickness which was about the same as the wavelength of light, as in the multifilaments of the present invention, yellow knitted goods with an interference effect close to the natural color was obtained by the combined effects of diffraction of light and interference of light.

EXAMPLE 2

50 parts of polyethylene terephthalate (intrinsic viscosity 0.60, refractive index $N_D = 1.58$, no additives, melting point 260° C) and 50 parts of nylon-66 (relative viscosity in sulfuric acid 2.60, refractive index $N_D = 1.54$, no additives, melting poing 260° C) used as polymers were spun using a spinning apparatus as shown in FIG. 2, under the following spinning and drawing conditions.

The hole diameters and number of holes of the outlets of the rotary cylinder plug were 5 mm and 30, respectively, the width and depth of the slit were 5 mm and 4 mm, respectively, and number of orifices of the spinneret plate was 18. The draw temperature was so established as to become 285° C in the vicinity of the rotary cylinder plug, the output was 17.3 g/min., the r.p.m. of the rotary cylinder plug was 50 r.p.m. and the undrawn yarn discharged from the orifices was taken up at a rate of 800 m/min. This undrawn yarn was drawn at a temperature of 140° C, a draw ratio of 3.6 and a draw velocity of 400 m/min to obtain multifilaments having a denier per filament of 3, having in its cross section 16-layer annular rings.

In the cross section of these multifilaments, the intervals between the annular ring-like layers became successively smaller from the central portion, the minimum interval between the layers was within 1 micron, the distance between the tips of the central components having parabolic curved surfaces was about 1.9 m, and the length of a parabola of the same component was more than $5 \times 10^+$ times the fiber diameter.

In spite of the fact that these multifilaments contained no additives like titanium dioxide for making the yarn opaque, the two polymers alternately formed a plurality of annular rings, the thickness of one layer of the annular ring-like layers became successively smaller from the center of the fiber to the surface layer, and the thickness of one layer in the vicinity of the surface layer was about 0.5 micron which was the wavelength of light. Perhaps because of this, the multifilaments were opaque, having a luster with various colors by interference effect considered due to the diffraction of light and the interference effect of light. A woven fabric obtained by weaving these multifilaments was greatly different in respect of luster as compared to knitted goods composed of polyethylene terephthalate yarn containing titanium dioxide as an opacifier and a nylon-66 yarn, and the woven fabric obtained by weaving these multifilaments turned out to have a luster with various colors by an interference effect.

EXAMPLE 3

60 parts of transparent nylon-6 (relative viscosity in sulfuric acid 2.60, refractive index $N_D = 1.54$, melting point 220° C) and 40 parts of transparent polypropylene (intrinsic viscosity measured in tetralin at 135° C of 1.40, refractive index $N_D = 1.49$, melting point 165° C) which was an incompatible polymer with nylon-6, were produced using a spinning apparatus as shown in FIG. 2, under the following spinning and drawing conditions.

The hole diameters and the number of holes of the outlets of the rotary cylinder plug were 5 mm and 20, respectively, the width and depth of the slit were 5 mm and 4 mm, respectively, and the number of orifices of the spinneret plate was 18. The spinning temperature was so established as to become 260° C in the vicinity of the rotary cylinder plug, the output was 19.2 g/min, the r.p.m. of the rotary cylinder plug was 10 r.p.m. and the undrawn yarn discharged from the orifices was taken up at a rate of 800 m/min to obtain multifilaments having a denier per filament of about 12 and having 6-layer annular rings as shown in FIG. 6.

In the cross section of these multifilaments, the intervals between the annular ring-like layers became successively smaller from the central portion, the minimum interval between the layers was within 1 micron, the distance between the tips of the central components having parabolic curved surfaces was about 16 m, and the length of a parabola of the same component was more than $5 \times 10^5$ times the fiber diameter.

These multifilaments were drawn at a drawing temperature of 130° C, a draw ratio of 4.0 and a draw velocity of 200 m/min. However, there was almost no yarn breakage during the drawing, the drawability was excellent and drawn multifilaments having a denier per filament of about 3 were obtained.

On the other hand, by the method disclosed in Japanese Patent Application Publication No. 44447/1972, the same polymers as mentioned above were spun to obtain a fiber having longitudinal layers as shown in FIG. 5. However, when drawing was attempted under these conditions, peeling occurred in the boundary surface between the nylon-6 and the polypropylene, yarn breakage was frequent and it was difficult to draw the fiber. On the other hand, because in the multiple layer conjugate fiber of the present invention the area of contact of nylon-6 with polypropylene was far greater, peeling did not occur at the boundary surfaces. The physical properties of the undrawn yarns and drawn yarns of the annular ring-like fiber and the fiber with longitudinal layers were measured and the data shown in Table 1 were obtained. The annular ring-like fiber had superior tenacity as compared with the known fiber. In addition, the drawn yarn was opaque as if it contained an opacifier, despite the fact that the materials used were transparent. It had a luster created by various colors and by the aforementioned interference effect. However, the fiber of the prior art with longitudinal layers had almost no opacity and its luster was the same as that of a yarn consisting of blended nylon-6 and polypropylene.

Table 1

| | | This invention Multiple layer conjugate fiber | Comparative example Fiber with longitudinal layers |
|---|---|---|---|
| Undrawn yarn | Tenacity (g/d) | 0.5 | 0.5 |
| | Elongation (%) | 380 | 120 |
| Drawn yarn | Tenacity (g/d) | 5.0 | 2.0 |
| | Elongation (%) | 40 | 10 |

EXAMPLE 4

60 parts of polyethylene terephthalate (intrinsic viscosity 0.60, refractive index $N_D = 1.58$, melting point 260° C) and 40 parts of polystyrene ("Styron " 679 of Asahi-Dow Co., refractive index $N_D = 1.59$, Vicat softening point 78° C) were used instead of the polymers of Example 3 and spun under the same spinning and drawing conditions as in Example 3 to obtain undrawn multifilaments of 12 denier per filament.

In the cross section of these multifilaments, the intervals between the annular ring-like layers became successively smaller from the central portion, the minimum interval between layers was within 1 micron, the distance between the tips of the central components having parabolic curved surfaces was about 16 m, and the length of a parabola of the same component was more than $5 \times 10^5$ times the fiber diameter.

A plurality of these multifilaments were merged and drawn in a hot water draw bath at a draw velocity of 10 m/min to obtain a 400,000 denier tow. This tow was subjected to a Perlock converter to obtain staple having an average fiber length of 100 mm. Using an undrawn yarn obtained by spinning this staple, a fabric was woven. This fabric had a touch which was surprisingly essentially the same as that of fur, having a luster with various colors by the aforementioned interference effect, and was considered to have greater commercial value as compared to fabrics using undrawn yarn spun by subjecting ordinary polyethylene terephthalate yarn to a Perlock converter. The fabric using the multiple layer conjugate fiber had a touch similar to that of fur because a greater percentage of the ends of the broken yarn had parabolic tips.

EXAMPLE 5

When the woven fabric of Example 4 was treated with trichloroethylene to dissolve part of the polystyrene, a woven fabric was obtained which had a touch which was even softer than the touch of the woven fabric of Example 4. It had a luster caused by various colors and the interference effect.

EXAMPLE 6

70 parts of polyethylene terephthalate (intrinsic viscosity 0.60, refractive index $N_D = 1.58$, melting point 260° C) and 30 parts of polyethylene ("Hizex 5000S" manufactured by Mitsui Petrochemical Co., refractive index $N_D = 1.54$, melting point 130° C) were used instead of the polymers of Example 1. They were spun under spinning and drawing conditions the same as in Example 1 to obtain multifilaments having a per-filament denier of about 10 and 6-layer annular ring-like layers.

In the cross section of these multifilaments, the intervals between the annular ring-like layers became successively smaller from the central portion, the minimum interval between the layers was within 1 micron, the distance between the tips of the central components having parabolic curved surfaces was about 3.5 m, and the length of a parabola of the same component was more than $10^5$ times the fiber diameter.

These multifilaments were drawn at a draw ratio of 3.5 times and a draw velocity of 100 m/min in a hot water draw bath at a draw temperature of 95° C. When this drawn yarn was treated at a treating speed of 50 m/min, a treating temperature of 170° C and a draw ratio of 1.5, the polyethylene portion was melted and fused, and a partly fused net-like fiber having a luster with various colors and exhibiting the results of the interference effect was obtained.

EXAMPLE 7

The multiple layer conjugate fiber obtained in Example 4 was knitted to obtain a knitted sock having a luster showing various colors by virtue of the interference effect. This knitted sock was immersed in a trichlorethylene bath to dissolve part of the polystyrene. This knitted sock had a soft touch as compared to the knitted goods before treatment, and had a luster with various colors exhibiting the interference effect. The touch became soft because part of the polystyrene was dissolved and the surface of the multiple layer conjugate fiber became similar to a wool-like surface.

EXAMPLE 8

50 parts of a 20% dimethylsulfoxide solution of polyacrylonitrile (obtained by copolymerizing 0.5 mol % of sodium allyl sulfonate and 7.0 mol % of methyl acrylate, refractive index $N_D = 1.50$) and 50 parts of a 20% dimethylsulfoxide solution of polyacrylonitrile (obtained by copolymerizing 0.5 mol % of sodium allyl sulfonate and 4.0 mol % of methyl acrylate, refractive index $N_D = 1.50$) were produced using the spinning apparatus shown in FIG. 2 under the following spinning and drawing conditions.

The hole diameter and number of holes of the outlets of the rotary cylinder plug were 2 mm and 20, respectively, the width and depth of the slit were 2 mm and 2 mm, respectively, the diameter and number of orifices of the spinneret plate were 0.08 mm and 100, respectively, and the center of the slit and the centers of the orifices were positioned by sliding along the center line. The r.p.m. of the rotary cylinder plug was 10. Water was used as a coagulating liquid. The polymer solutions were discharged at a rate of 6 m/min in a first stage to obtain multifilaments having a per-filament denier of 3, having 6-layer annular ring-like layers, the centers of which annular ring-like layers were slid eccentrically as shown in FIG. 8.

In the cross sections of these multifilaments, the intervals between the annular ring-like layers became successively smaller from the central portion, the minimum interval between the layers was within 1 micron, the distance between the tips of the central components having parabolic curved surfaces was about 18 cm and the length of a parabola of the same component was more than $10^4$ times the fiber diameter.

When these multifilaments were heat-treated at 100° C, a fiber developing very fine crimps, and having a luster with various colors by reason of the interference effect, was obtained.

EXAMPLE 9

50 parts of polyethylene terephthalate having an intrinsic viscosity of 0.48 (refractive index $N_D = 1.58$, melting point 260° C) and 50 parts of polyethylene terephthalate having an intrinsic viscosity of 0.80 (refractive index $N_D = 1.58$, melting point 260° C) used as polymers were produced under spinning and drawing conditions about the same as those in Example 1. One difference was that the orifices of the spinneret plate were T-shaped, and the orifices were so positioned that the center of the slit was in accord with the center of the foot of the T-shaped orifice. Under such spinning and drawing conditions, T-shaped multifilaments having a per-filament denier of 3, and having 6-layer annular ring-like layers as shown in FIG. 11, were obtained.

In cross sections of these multifilaments, the intervals between the annular ring-like layers became successively smaller from the central portion, the minimum interval between the layers was within 1 micron, the distance between the tips of the central components having parabolic curved surfaces was about 3.5 m and the length of a parabola of the same component was more than $10^5$ times the fiber diameter.

When these multifilaments were woven into a fabric and treated with steam, very fine crimps developed in the fabric. At the same time, a woven fabric having a silk-like luster was obtained.

EXAMPLE 10

70 parts of polyethylene terephthalate (intrinsice viscosity 0.60, refractive index $N_D = 1.58$, melting point 260° C) and 30 parts of polyethylene glycol (molecular weight $2 \times 10^5$, refractive index $N_D = 1.51$, melting point 80° C) were used instead of the polymers of Example 1 and made under the same spinning and drawing conditions as in Example 1 to obtain multifilaments having a per-filament denier of 3 and having 6-layer annular ring-like layers.

In the cross sections of these multifilaments, the intervals between the ring-like layers became successively smaller from the central portion, the minimum interval between the layers was within 1 micron, the distance between the tips of the central components having parabolic curved surfaces was about 3.5 m, and the length of a parabola of the same component was more than $10^5$ times the fiber diameter.

When the specific electrical resistance of these multifilaments was measured in the atmosphere at 20° C and 65 percent relative humidity, it was $5 \times 10^7$ ohm-cm in contrast to the specific electrical resistance of a fiber consisting of an ordinary polyethylene terephthalate only which was $6 \times 10^{12}$ ohm-cm, and these multifilaments exhibited a pronounced antistatic effect together with a luster with various colors by the interference effect.

EXAMPLE 11

40 parts of polyethylene terephthalate (intrinsic viscosity 0.60, refractive index $N_D = 1.58$, melting point 260° C), 30 parts of nylon-6 (relative viscosity in sulfuric acid 2.60, refractive index $N_D = 1.54$, melting point 220° C) and 30 parts of polypropylene (intrinsic viscosity 1.40, refractive index $N_D = 1.49$, melting point 165° C) used as polymers were spun using a spinning apparatus obtained by remodeling the spinning apparatus shown in FIG. 2 and providing three inlets, under the following spinning and drawing conditions.

The hole diameter and number of holes of the outlets of the rotary cylinder plug were 5 mm and 21, respectively and the width and depth of the slit were 5 mm and 2 mm, respectively. In a slit, in order that the three kinds of polymers might be alternately laminated, it was so set up that the three kinds of polymers might flow adjoiningly in the outlets. The number of orifices in the spinneret plate was 18. The spinning temperature was so established as to be 280° C in the vicinity of the rotary cylinder plug, the r.p.m. of the rotary cylinder plug was 40 r.p.m. and the undrawn yarn discharged from the orifices was taken up at a rate of 800 m/min. This undrawn yarn was then drawn at a drawn temperature of 120° C, a draw ratio of 3.5 and a draw velocity of 200 m/min to obtain multifilaments having a denier per filament of 3 and having at least 6-layer annular ring-like layers.

In the cross sections of these multifilaments, the intervals between the annular ring-like layers became successively smaller from the central portion, the minimum interval between the layers was within 1 micron, the distance between the tips of the central components having parabolic curved surfaces was about 3.3 m, and the length of a parabola of the same component was more than $10^5$ times the fiber diameter.

These multifilaments had a luster with various colors by reason of the interference effect.

EXAMPLE 12

50 parts of a polymer obtained by merging at a ratio of 50:50, in a side-by-side pattern, polyethylene terephthalate (intrinsic viscosity 0.60, refractive index $N_D = 1.58$, melting point 260° C) and nylon-6 (relative viscosity in sulfuric acid 2.60, refractive index $N_D = 1.54$, melting point 220° C) and 50 parts of nylon-66 (relative viscosity in sulfuric acid 2.60, refractive index $N_D = 1.54$, melting point 260° C) were produced under the same spinning and drawing conditions as in Example 1 to obtain multifilaments having a denier per filament of 3, and having 9-layer annular ring-like layers as shown in FIG. 12.

In the cross sections of these multifilaments, the intervals between the ring-like layers became successively smaller from the central portion, the minimum interval between the layers was within 1 micron, the distance between the tips of the central components having parabolic curved surfaces was about 3.5 m, and the length of a parabola of the same component was more than $10^5$ times the fiber diameter.

These multifilaments were woven into a fabric. This fabric had a luster with various colors by reason of the interference effect. When this fabric was treated with caustic soda to dissolve partly the polyethylene terephthalate, the fabric had a luster with various colors showing the interference effect, and had a fur-like touch.

EXAMPLE 13

Synthetic polymers in which the component ratios of polymers were all 50/50 shown in Table 2 (a) and Table 2 (b) were spun using the apparatus shown in FIG. 1 under the following spinning and drawing conditions:

| | |
|---|---|
| Diameter of the outlet of the rotary cylinder plug | 5 mm |
| Number of outlets of the rotary cylinder plug | 20 |
| Width of slit | 5 mm |
| Depth of slit | 2 mm |
| Number of orifices of spinneret plate | 18 |
| Output | 16.8 g/min |
| R.p.m. of rotary cylinder plug | 40 r.p.m. |
| Spinning rate | 800 m/min |

The cross section of each of the resulting multifilaments formed 8-layer annular rings, the intervals between the annular rings became smaller from the central portion and the minimum interval between the annular rings was within 1 micron.

In the longitudinal side section of each of the resulting multifilaments, the distance between the tips of the central components having parabolic curved surfaces was about 3.5 m and the length of the parabola was more than $10^5$ times the fiber diameter.

Each of these multifilaments was drawn at a ratio of 3.5 and a velocity of 200 m/min. The effects are shown in Tables 2 (a) and 2 (b).

Table 2 (a)

| Polymer composition (A/B) | Spinning temperature (°C) | Refractive index ($N_D/N_D$) | Melting point (°C/°C) | Treating conditions | Effect |
|---|---|---|---|---|---|
| Poly ε-capramide (spun dyed in red)/ poly ε-capramide (spun dyed in yellow) | 260 | 1.54/1.54 | 220/220 | | Yarn having an orange tint with an interference effect was obtained. |
| Poly ε-capramide (amount of amino and group $2 \times 10^{-5}$ mol/mol)/poly ε-capramide (amount of amino and group $8 \times 10^{-5}$ mol/mol) | 260 | 1.54/1.54 | 220/220 | Woven into a fabric and dyed with a yellow dyeing acid dye, Suminol Fast Yellow R conc. (0.5% owf) | Fabric having a yellow tint with an interference effect was obtained. |
| Poly ε-capramide/ 5-sodium sulfo-isophthalic acid copolymerized polyethylene terephthalate | 285 | 1.54/1.59 | 220/255 | Knitted into a fabric and dyed with a yellow dyeing acid dye, Suminol Fast Yellow R conc. (0.5% owf) | Knitted fabric unlikely to fibrilate as compared with a knitted fabric of poly ε-capramide and polyethylene terephthalate having a clear color and a luster with various colors by interference effect was obtained. |
| polyethylene terephthalate/5-sodium | 290 | 1.59/1.59 | 260/255 | Woven into a fabric and dyed with a basic dye, Malachite | Fabric having a green tint with interference effect was obtained. |

Table 2 (a)-continued

| Polymer composition (A/B) | Spinning temperature (°C) | Refractive index (N_D/N_D) | Melting point (°C/°C) | Treating conditions | Effect |
|---|---|---|---|---|---|
| sulfoisophthalic acid copolymerized polyethylene terephthalate | | | | Green (C.I. Basic green 4) (0.5% owf) | |
| Poly ε-capramide/ polyurethane | 250 | 1.54/1.50 | 220/200 | | No stickiness upon winding the undrawn yarn; spinnability was good. Yarn having excellent elastic properties was obtained. When this yarn was knitted into panty-hose, they were of good quality and had good stretch-back properties. |

Table 2 (b)

| Polymer composition (A/B) | Spinning temperature (°C) | Refractive index (N_D/N_D) | Melting point (°C/°C) | Treating conditions | Effect |
|---|---|---|---|---|---|
| Poly ε-capramide/ polyhexamethylene adipamide | 290 | 1.54/1.54 | 220/260 | This drawn yarn was false twisted at 220° C, higher than melting point of one component. | Partly fused false twisted yarn having a linen-like touch was obtained. |
| Polyethylene terephthalate/polybutylene terephthalate | 290 | 1.59/1.58 | 260/225 | This drawn yarn was run over a hot plate at 230° C (a temperature higher than the melting point of one component). | Linen-like yarn was obtained. |
| Polyethylene terephthalate/10 mol % isophthalic acid copolymerized polyethylene terephthalate | 290 | 1.59/1.58 | 260/234 | This drawn yarn was run over a hot plate at 235° C, higher than the melting point of one component. | Partly fused linen-like yarn was obtained. |
| Polyethylene terephthalate/10 mol % adipic acid copolymerized polyethylene terephthalate | 290 | 1.59/1.58 | 260/220 | This drawn yarn was run over a hot plate at 225° C, higher than the melting point of one component. | Partly fused linen-like yarn was obtained. |

The following is claimed:

1. A multiple layer conjugate fiber comprising at least two different fiber forming synthetic polymers, wherein the synthetic polymers are successively arranged along the length of the fiber and each has an annular ring-like shape in cross section and a substantially parabolic interface in longitudinal side section, wherein the distance between tips of central components having parabolic curved surfaces is at least about 0.1m, and wherein two different synthetic polymers are used and the relative weight percentages of the two is within the range of about 20/80 to 80/20.

2. A fiber as defined in claim 1, wherein the annular ring-like shape has at least 3 layers of annular ring.

3. A fiber as defined in claim 1, wherein the ring-like shape has at least 6 layers of annular ring.

4. A fiber as defined in claim 1, wherein, when two measurement lines are drawn and intersected at a right angle at the substantial center of the polymer existing at the center of the cross section, the number of intersections of one line with the polymer interfaces is greater than one-fourth the number of intersections along the other line.

5. A fiber as defined in claim 1, wherein the ring-like shape has an eccentric relationship with the fiber.

6. A fiber as defined in claim 1, wherein the intervals between the annular rings becomes substantially smaller in order from the center through the outer layer viewed in cross section, and the minimum interval at the outer layer is within about 2 microns.

7. A fiber as defined in claim 1, wherein the distance between central components adjoined with different polymers are unequal.

8. A fiber as defined in claim 1, wherein the length of the parabola in side section is at least about ten thousand times the fiber diameter.

9. A fiber as defined in claim 1, wherein the fiber has a cross section of non-circular shape.

10. A fiber as defined in claim 1, wherein the synthetic polymers are selected from the group consisting of polyolefin, polyamide, polyacrylonitrile, copolymer of acrylonitrile, polyester, chlorine-containing polymer, a fluorine-containing polymer, polystyrene, styrene polymer, copolymer of styrene, polymethyl methacrylate, copolymer of methyl methacrylate, polyethylene oxide and polyurethane.

11. A fiber as defined in claim 10, wherein the synthetic polymers are polyester and polyamide.

12. A fiber as defined in claim 1, wherein the difference in refractive index of the respective polymers is about 0.01 – 0.25 inclusive.

13. A fiber as defined in claim 1, wherein the respective polymers have different dyeability.

14. A fiber as defined in claim 1, wherein the respective polymers have different solubility.

15. A fiber as defined in claim 1, wherein the difference of melting point between the polymers is about 10° C to 200° C.

* * * * *